(12) United States Patent
Lähteenmäki

(10) Patent No.: US 7,114,175 B2
(45) Date of Patent: Sep. 26, 2006

(54) SYSTEM AND METHOD FOR MANAGING NETWORK SERVICE ACCESS AND ENROLLMENT

(75) Inventor: Markku Lähteenmäki, Helsinki (FI)

(73) Assignee: Nokia Corporation, Espoo (FI)

( * ) Notice: Subject to any disclaimer, the term of this patent is extended or adjusted under 35 U.S.C. 154(b) by 918 days.

(21) Appl. No.: 09/922,440

(22) Filed: Aug. 3, 2001

(65) Prior Publication Data

US 2003/0028805 A1 Feb. 6, 2003

(51) Int. Cl.
*H04L 9/32* (2006.01)
*G06F 15/16* (2006.01)

(52) U.S. Cl. .............................. 726/4; 726/27; 726/28; 726/29; 709/229

(58) Field of Classification Search ................ 713/201; 455/435.1; 709/229; 726/3–4, 26–29; 705/67; 380/270
See application file for complete search history.

(56) References Cited

U.S. PATENT DOCUMENTS

| | | |
|---|---|---|
| 5,339,403 A | 8/1994 | Parker |
| 5,715,403 A | 2/1998 | Stefik |
| 6,035,402 A | 3/2000 | Vaeth et al. |
| 6,367,013 B1 * | 4/2002 | Bisbee et al. ................ 713/178 |
| 6,385,651 B1 * | 5/2002 | Dancs et al. ................ 709/227 |
| 6,463,534 B1 * | 10/2002 | Geiger et al. ............... 713/168 |
| 2002/0004390 A1 * | 1/2002 | Cutaia et al. ............... 455/424 |

OTHER PUBLICATIONS

Version Apr. 24, 2001 *Wireless Application Protocol Public Key Infrastructure Definition* (WAP-217-WPKI), Wireless Application Forum, Ltd.

* cited by examiner

Primary Examiner—Emmanuel L. Moise
Assistant Examiner—MinhDieu Nguyen
(74) Attorney, Agent, or Firm—Hollingsworth & Funk, LLC

(57) ABSTRACT

A system and method for automatically switching network connections to an appropriate network entity based on access rights possessed by a user of a wireless terminal. A switch recognizes the certificate provided by a terminal, and directs the connection to the service provider hosting a targeted secure service if the certificate proves to have the appropriate access rights. The switch directs the connection to an enrollment module if the certificate does not correspond to the service provider's required certificate, where the user can attempt to obtain the appropriate certificate from the enrollment module to ultimately access the targeted secure service.

34 Claims, 8 Drawing Sheets

SYSTEM AND METHOD FOR MANAGING NETWORK SERVICE ACCESS AND ENROLLMENT

FIELD OF THE INVENTION

The present invention relates generally to network communications systems, and more particularly, to a system and method for managing user access and enrollment for secure network services.

BACKGROUND OF THE INVENTION

Computer networking broadly refers to the data communication system resulting from linking two or more computing systems. Networking allows those who can access the network to share programs, data, network resources, database information, and to facilitate other functions such as e-mail and data backups. The need for immediate access to information has fueled the pursuit of more sophisticated networks and network applications to conveniently and efficiently communicate information.

Due to its vast reach, the global web of interconnected computers and computer networks referred to as the Internet has proved to be an invaluable tool in satisfying the need for on-demand information. The Internet is used as a business and personal tool to facilitate global e-mail, remote data access, research, etc. Its ability to deliver multimedia content has also established the Internet as an entertainment tool for playing games, delivering stream content such as video, audio and MP3, and the like.

Gaining access to the information available on the Internet conventionally required a hardware connection to the Internet. While the Internet allows users to access information via any computer or terminal connected to the Internet, the need for a hardware connection established an undesirable physical limitation to Internet information access—a particular impediment to users that spend a substantial amount of time on the move. As users become more dependent on information and services provided via the Internet, an integration of the Internet and the wireless domain becomes increasingly important.

Wireless networks, such as GSM, IS-136, IS-95, PDC, etc., have traditionally been used in connection with mobile telephone communication. These sophisticated wireless networks made possible another aspect of communication convenience, by allowing mobile telephone users to communicate with other mobile users and with landline telephony systems. However, a need to integrate information networks such as intranets and the Internet, with the portability and convenience of mobile devices, still existed.

This need gave rise to efforts to integrate the Internet and other networks with wireless network platforms. One solution is the Wireless Application Protocol (WAP) which brings the convenience of the Internet into the wireless community. WAP bridges the gap between the wireline Internet paradigm and the wireless domain, to allow wireless device users to enjoy the benefits of the Internet across both platforms.

Generally, WAP is a set of protocols that accounts for characteristics and functionality of both Internet standards and standards for wireless services. It is independent of wireless network standards, and is designed as an open standard. The motivations for WAP are primarily a result of physical and logical limitations of small wireless devices, such as limited keyboards and displays, limited bandwidth, limited memory and processing capabilities, and limited battery power. A markup language, referred to as the wireless markup language (WML), is used for authoring services designed to fit these smaller, and often portable, handheld devices that have a considerably limited display area as compared to their desktop counterparts targeted by HTML. Another feature of WAP services is the availability of supporting more advanced functional tasks using WMLScript, which is at least loosely analogous to utilizing JavaScript in connection with HTML (HyperText Markup Language). The functional enhancements available through WMLScript include procedural logic and computational functions to WAP-based services.

WAP therefore allows desired information stored on a remote network to be delivered to the wireless device within the wireless network. For example, information available via the Internet can now be downloaded onto mobile wireless units, such as cellular telephones, personal digital assistants (PDAs), laptop computers, wireless pager, etc.

However, the ability to electronically communicate information, especially when communicated over the air (OTA), presents a variety of security issues. In order to maintain privacy and confidentiality in communications and e-commerce transactions, the computer and telecommunications industries have devised manners of providing secure connections. For example, in the Internet arena, security is often provided through the Transport Layer Security (TLS), which is a standardized name for the Secure Sockets Layer (SSL). In wireless environments such as WAP environments, security is currently provided in the Wireless Transport Layer Security (WTLS) protocol which is similar to the TLS, but includes differences relating largely to the low bandwidth requirements of current wireless communications.

In order to provide the requisite security for a particular wireless application or transaction, certain types of "certificates" are implemented. For example, authentication certificates may be granted where a user has been confirmed as an authorized user. Authorization certificates may be granted where it has been determined that a user has the authority to access or modify specific information. The authorization certificate may also include non-repudiation information, which refers to a manner of ensuring that a user cannot later deny that the user took part in the transaction.

In order for a user to access a particular secure service, the user may be required to obtain these certificates through proper registration procedures. If the user already has such certificates, for example through local storage on the mobile terminal, the user can access the secure service. However, if the user has not yet been provided with such certificates, they must be obtained before the user can access the desired secure service.

Currently, a user accesses the desired service through a WAP session via a first gateway when the user is equipped with the appropriate certificates to effect the desired communication or carry out the desired transaction. If the user does not have the requisite certificates, the attempted connection will be denied, and the user must obtain OTA WAP settings indicative of how to obtain the requisite certificates. The user must close out of the current WAP session, open a new WAP session, and obtain registration information via a second gateway. When the user receives the certificates, the old WAP settings must be delivered OTA to the user, the customer closes out of the current WAP session, and restarts a WAP session to access the desired service. Such a manner of obtaining the requisite certificates requires multiple WAP sessions through multiple gateways, and proves inefficient and complex for the user.

It would be desirable to provide a more efficient and convenient manner of accessing secure services, regardless of whether or not the user already has been authenticated and/or authorized to use such service. Thus, it would be desirable to avoid the aforementioned and other problems associated with prior art systems. The present invention provides a solution to the aforementioned and other shortcomings of the prior art, while offering additional advantages over the prior art.

SUMMARY OF THE INVENTION

The present invention is directed to a system and method for automatically switching network connections to an appropriate network entity based on access rights possessed by a user of a wireless terminal.

In accordance with one embodiment of the invention, a method is provided for automatically directing network connections based on access rights possessed by a user of a wireless terminal. The method includes receiving a certificate, having security information indicative of the access rights possessed by the user, from the wireless terminal. It is determined whether the received certificate corresponds to a service provider authentication certificate which identifies access rights for a targeted service. The network connection is directed to the targeted service if the received certificate corresponds to the service provider authentication certificate, and is otherwise directed to an enrollment module to register for the service provider authentication certificate if the received certificate does not correspond to the service provider authentication certificate.

In accordance with another embodiment of the invention, a system is provided for managing access and enrollment for a secure service available to a user via a wireless terminal. The system includes a service module from which a service provider avails the secure service to the user of the wireless terminal. An enrollment manager is provided to effect user registration to the secure service. The system also includes a switch coupled to receive a security certificate utilized by the wireless terminal in establishing a connection. The switch directs the connection to either the service module or the enrollment manager depending on the security certificate utilized in establishing the connection.

In accordance with another embodiment of the invention, a system is provided for managing user access and enrollment for a secure service available on a network, where the system includes a wireless network. A plurality of wireless terminals are operable within the wireless network. Another network including a plurality of networked computing systems includes a server computing system hosting a secure service targeted by at least one of the wireless terminals. At least one of the computing systems of the networked computing systems is an enrollment server, used to effect user registration to the secure service. A gateway computing system is provided, which is configured to bridge communications between the wireless network and the network of computing systems. A network switch is coupled to receive an authentication certificate utilized by a wireless terminal in establishing a connection with the network of computing systems. The network switch switches the connection to the server computing system, or the enrollment server, depending on the authentication certificate utilized by the wireless terminal in establishing the connection.

The above summary of the present invention is not intended to describe each illustrated embodiment or implementation of the present invention. This is the purpose of the figures and the associated discussion which follows.

DETAILED DESCRIPTION OF THE ILLUSTRATED EMBODIMENTS

In the following description of the various embodiments, reference is made to the accompanying drawings which form a part hereof, and in which is shown by way of illustration various embodiments in which the invention may be practiced. It is to be understood that other embodiments may be utilized, and structural and functional modifications may be made without departing from the scope of the present invention.

The present invention is directed to a system and method for automatically switching network connections to an appropriate network entity based on access rights possessed by a user of a wireless terminal. The switch recognizes the certificate provided by the wireless terminal, and directs the connection to the service provider hosting a targeted secure service if the certificate proves to have the appropriate access rights. On the other hand, the switch directs the connection to an enrollment module if the certificate does not correspond to the service provider's required certificate, where the user can attempt to obtain the appropriate certificate from the enrollment module to ultimately access the targeted secure service.

Figure 1:
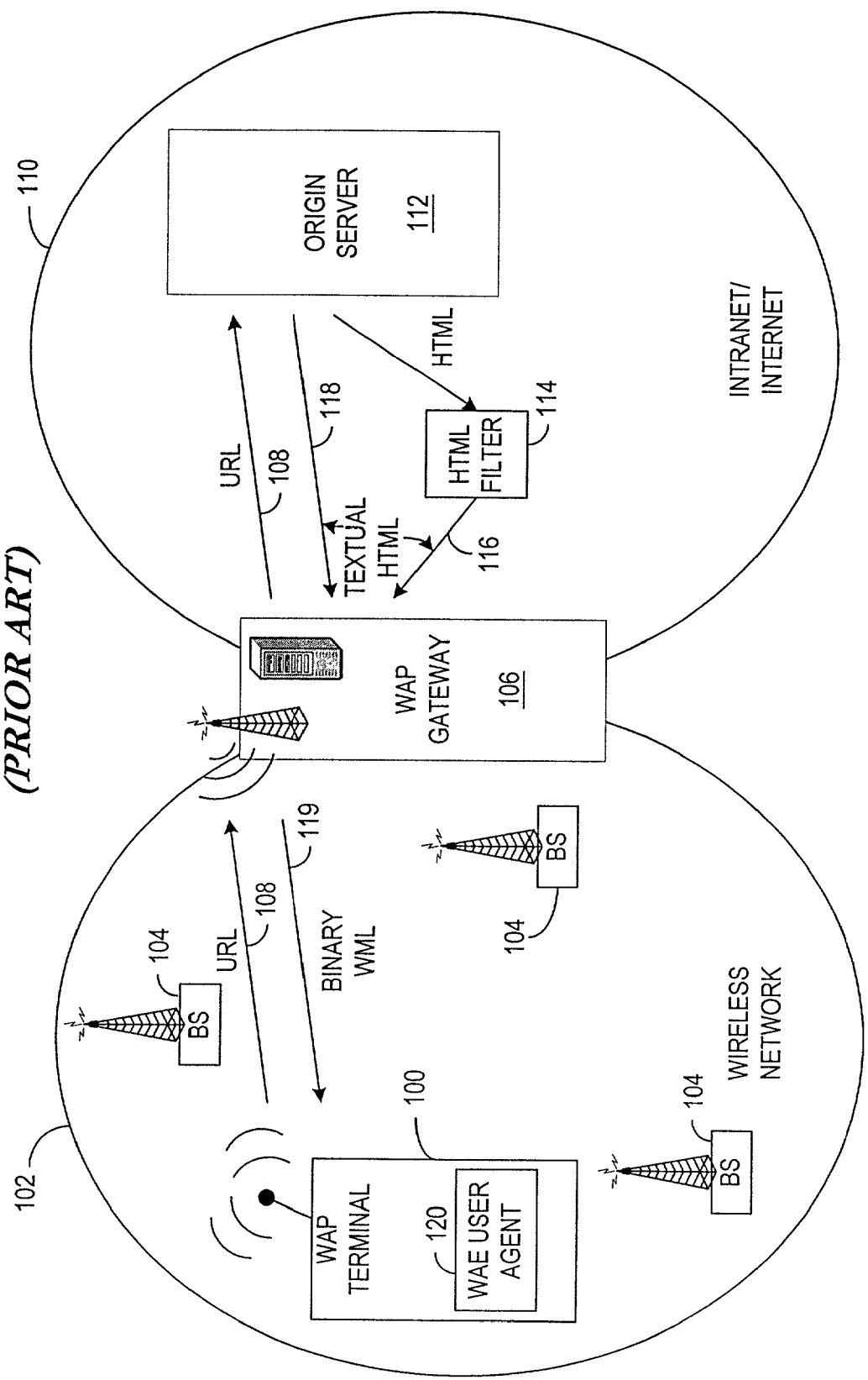
FIG. 1 is an exemplary embodiment of a networking environment in which the principles of the present invention may be applied.

FIG. 1 is an exemplary embodiment of a networking environment in which the principles of the present invention may be applied. The invention described herein is generally described in terms of the Wireless Application Protocol (WAP). However, as will become readily apparent to those skilled in the art from an understanding of the description provided herein, the invention is equally applicable to other current or future wireless protocols in which some level of secure connection is desired. Therefore, it should be recognized that the invention is described in connection with a WAP environment for purposes of facilitating an understanding of the invention, although the invention is not limited thereto.

In the exemplary, conventional WAP environment shown in FIG. 1, a WAP terminal 100 operates within a wireless network 102, for example, a GSM (global system for mobile communication) network, advanced GSM networks such as GPRS (General Packet Radio Service), HSCSD (High-Speed Circuit-Switched Data), or other type of second generation (2G), third generation (3G), or future network. Further examples of such networks include, but are not limited to, WCDMA (Wideband Code Division Multiple Access), EDGE (Enhanced Data Rates for Global Evolution), CDMA 2000, and cdmaOne to name a few. The present invention is also applicable to other wireless networking technologies that are capable of integration with other networks such as intranets and the Internet. Within the wireless network 102, the WAP terminal 100 may communicate with other wireless devices or landline devices as facilitated by, for example, base stations 104.

A request for information may be transmitted from the wireless network 102 to the WAP gateway 106 by way of a Uniform Resource Locator (URL), generally using the Wireless Session Protocol (WSP), which is essentially a binary version of HTTP. The URL 108 is an address to the requested information that is available on a network 110, such as a landline network including an intranet or the Internet. Viewing from the intranet/Internet side, the WAP gateway 106 forwards the URL to the appropriate destination, and can provide additional information about the WAP device through HTTP headers, such as the subscriber number of a WAP-capable cellular phone, its cell ID, location, etc. The WAP gateway 106 also converts content directed to the WAP terminal 100 into a format that the WAP terminal 100 can understand, such as binary Wireless Markup Language (WML).

More particularly, the URL 108 is transmitted from the WAP gateway 106 using, for example, HTTP, to a server computing system such as the origin server 112. The request transmitted in the form of URL 108 is a request for the data server 112 to return the desired content. The data server 112 returns the requested content to the WAP gateway 106, which is ultimately perceivable by the WAP terminal 100. In one embodiment, the requested content is provided by the origin server 112 in HTML format to an HTML filter 114 that filters out graphics and other content in order to provide textual HTML as depicted by line 1 16. The origin server 112 may also directly provide textual HTML as depicted by line 118. In either case, the WAP gateway 106 receives the textual HTML content, and converts the textual HTML content to binary WML as shown on line 119 for processing and presentation at the WAP terminal 100.

The origin server 112 may alternatively be configured in an intranet or local area network (LAN). The intranet 110 may be architecturally configured to directly communicate with the WAP gateway, or alternatively may be "behind" the Internet. In such a networking environment, the URL 108 is transmitted from the WAP gateway 106 to a local server (not shown), which can then retrieve information from the origin server 112. The present invention may be implemented in connection with any network that can communicate with the WAP gateway 106, and includes various multi-node network structures such as multipoint, star, ring, loop, mesh, etc. network topologies used in networks ranging from local area networks (LAN) to proliferative global area networks (GAN) such as the Internet.

The WAP terminal 100 receives the WML content, and a micro browser within the terminal 100 coordinates the user interface. The WAE user agent 120 associated with the terminal 100 is an application environment that allows operators and service providers to efficiently build applications and services. The WAE 120 includes the micro browser referred to above.

Whenever an electronic transmission or exchange of data occurs, the issue of security of that transmission or exchange arises. In order to maintain privacy and confidentiality in communications and e-commerce transactions, security may be of utmost importance. In order to address security issues, the computer and telecommunications industries have devised manners of providing secure connections. For example, in the Internet arena, security is often provided through the Transport Layer Security (TLS), which is a standardized name for the Secure Sockets Layer (SSL).

While wireless environments provide a heightened degree of convenience, they also bring additional security risks and concerns based largely on the accessibility of the transmission medium itself. Thus, facilitating secure connections in wireless communications requires careful attention. In the WAP environment, security is currently provided in the Wireless Transport Layer Security (WTLS) protocol which is similar to the TLS, but includes differences relating largely to the low bandwidth requirements of current wireless communications.

Figure 2:
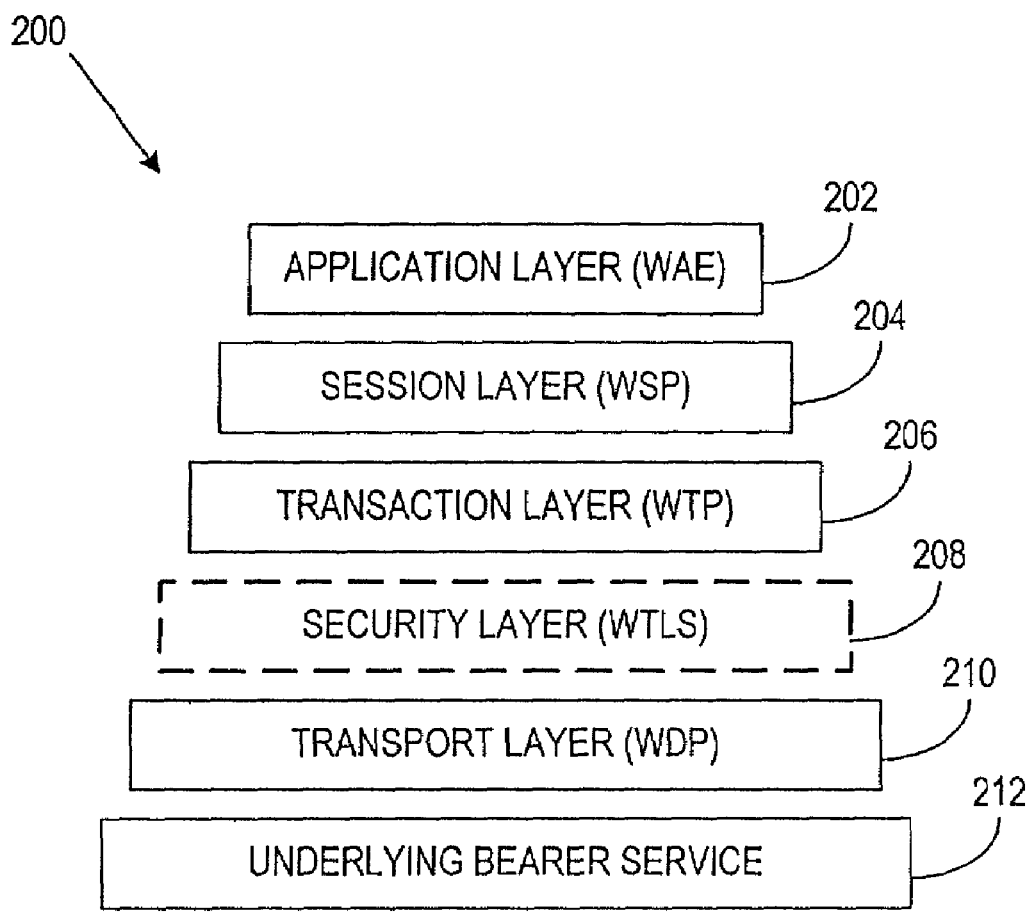
FIG. 2 illustrates an example of a typical WAP reference model and the layering of WAP protocols.

FIG. 2 illustrates an example of a typical WAP reference model 200 and the layering of WAP protocols. The top layer shown is the application layer 202, which is the Wireless Application Environment (WAE) layer for WAP architectures. This layer establishes an interoperable environment allowing operators and service providers to build applications and services reaching a variety of different wireless platforms. The WAE layer 202 typically includes a micro-browser that provides a user interface for mobile device users. The next depicted layer is the session layer 204, which is the Wireless Session Protocol (WSP) layer in the WAP environment. The WSP layer provides an interface to the WAE layer 202, including a connection-oriented and a connectionless service. The transaction layer 206, or Wireless Transaction Protocol (WTP) layer, provides transaction services. The transport or Wireless Datagram Protocol (WDP) layer 210 offers consistent service to the upper layer protocols of WAP, and communicates transparently over one of the available underlying bearer services 212. Other WAP applications may involve a different number of layers or layer variations, and FIG. 2 provides one typical example of a WAP application.

Added to this core transmission protocol is the Wireless Transport Layer Security (WTLS) that adds optional encryption facilities to enable secure transactions. Although optional, the WTLS associated with the security layer 208 shown in FIG. 2 has proved to be an important aspect of wireless communications. WTLS is a security protocol providing the main security elements of WAP communications, and thus provides a secure network connection session between a WAP terminal and a WAP gateway. As will be described more fully below, WTLS provides a host of security features, including authentication, confidentiality, data integrity, and denial-of-service protection.

The WTLS security layer described in FIG. 2 provides for various levels of security. For example, WTLS Class 1 generally provides privacy and data integrity. WTLS Class 2 provides privacy, data integrity, and WAP gateway authentication so the client can authenticate the identity of the gateway it is communicating with. A higher level of security is WTLS Class 3, which includes those features of Class 2, along with WAP client authentication, thereby providing mutual authentication between the WAP gateway and the WAP client.

Service providers may provide security-based services implementing the security features provided by wireless protocols such as WAP. For example, a WAP Public Key Infrastructure (WPKI) service is a WAP service that provides an application based on a Public Key Infrastructure (PKI), which refers to a manner of availing and accessing keys in a public key cryptosystem. WPKI thus provides a manner of enabling the trust relationships needed for authentication of servers and clients.

A good example of a PKI-based service is a banking application, requiring a high degree of security. In a PKI-based banking application, the client is authenticated using an authentication certificate. As is known in the art, authentication generally refers to the verification of the identity of the person or entity involved in the communication. Electronic authentication typically involves using a certificate that can be verified by a recognized Certification Authority (CA).

In addition to authentication, a transaction authorization procedure may be required to allow the client to effect the desired transaction. Authorization generally refers to the determination of a particular user's rights to access or modify specific information. Thus, even where a user's identity has been authenticated, it may still be necessary to ensure that the user has the appropriate rights to perform the desired transaction. For example, a user may be found to be authenticated for a banking application, but that authenticated user may not be authorized to carry out certain banking transactions relating to a particular bank account. Further, in connection with this authorization, non-repudiation may be involved, which refers to a manner of ensuring that a user cannot later deny that the user took part in the transaction. The client is authorized using a non-repudiation/digital signature certificate.

For certain levels of security, the client must have these authentication and non-repudiation/digital signature certificates in order to utilize the desired application. The certificates include information such as the public key, name of the user, and service provider's signature. In one exemplary system, the certificates are stored in the WAP terminal, such as in a WIM (WAP Identity Module or Wireless Identity Module). The WIM stores information necessary for the protocol to execute its security and authentication functions (e.g., private keys), and may be used to execute the associated public key algorithms (e.g., RSA, EC-DH, EC-DSA, etc.). A WIM may be provided integrally with a Subscriber Identity Module (SIM) on a common smart card, which in turn may be used in a mobile terminal such as a wireless telephone.

When a mobile user receives a WIM card, the certificates are not generally configured for the particular user, or for the user's use of a desired secure service. This configuration is required before the user can access the service, i.e., the user must register with the service. As will be described more fully below, an enrollment manager module is used to facilitate this registration. This module verifies the customer identity, and verifies that the user is in possession of requisite information such as the private keys in the WIM. If these verifications are successful, the user receives the authentication and non-repudiation certificates for that service.

More particularly, before customers/users are able to use mobile services that rely on the Wireless Public Key Infrastructure (WPKI) for user authentication, they need a service certificate or a URL pointing to the certificate installed on their mobile terminal. A service certificate is a standard form record that contains a description of its owner, including the public key. The Enrollment Manager enables on-line delivery of these service certificates. The user receives the service certificate via the mobile terminal without having to actually physically collect it.

In order to establish a secure connection between the requesting client terminal and the targeted server, an initial series of communications takes place to establish contact and arrange the initial manner in which these entities will communicate. This may be accomplished in a variety of manners, one of which is a handshake protocol identified in WAP Forum Wireless Application Protocol Wireless Transport Layer Security Specification (WAP WTLS). This Specification, WAP-199-WTLS (Version 18, February 1000) is one of a set of specifications resulting from the efforts of the WAP Forum, and is generally directed to the security layer protocol WTLS. The parameters of the secure session are produced by the WTLS handshake protocol through negotiation of the secure attributes of the desired secure session. In one embodiment of the invention, at least a portion of the WTLS handshake protocol may be used to attempt to establish a secure connection, and the principles of the present invention may be applied in connection with the WTLS or analogous handshake protocol.

Figure 3:
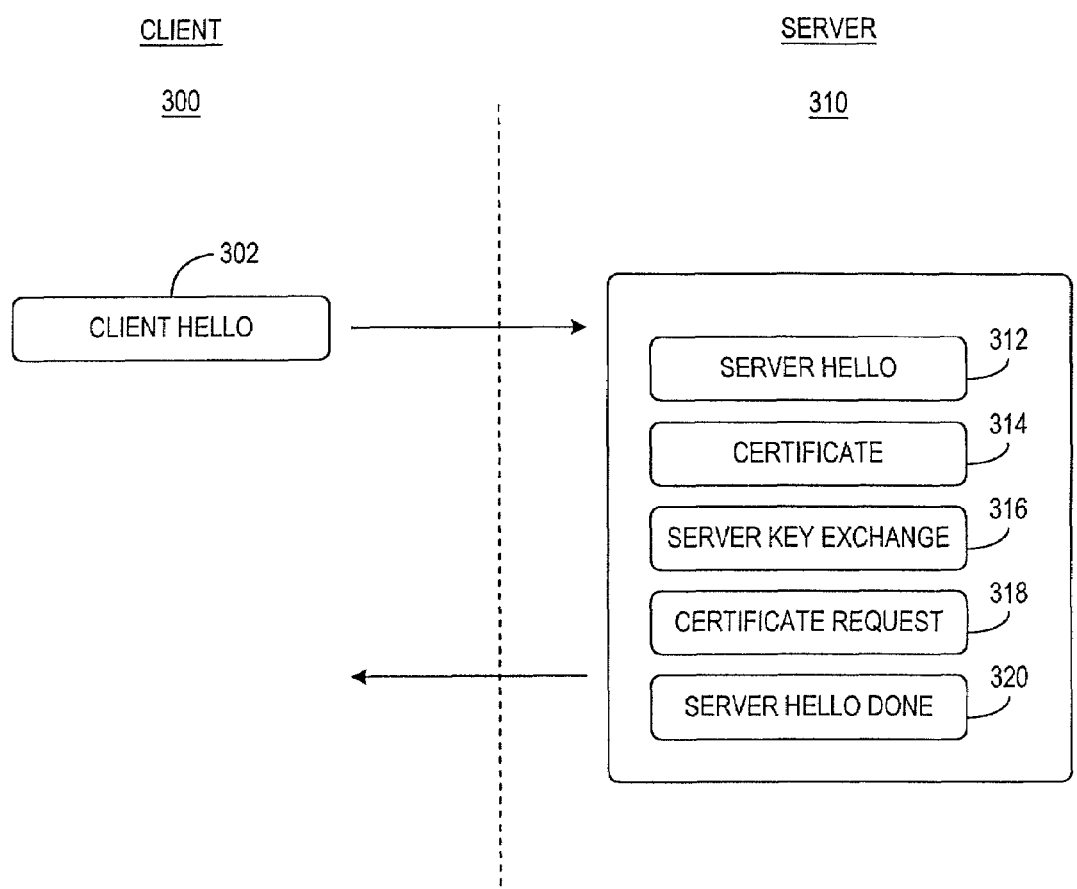
FIG. 3 illustrates an example handshake protocol used to establish a connection.

FIG. 3 illustrates an example handshake protocol used to establish a connection. An initial message, shown in FIG. 3 as the Client Hello message 302, is initiated on the client side 300 of the communicative exchange. This message 302 is the client's 300 first message to the server 310. On the server side 310, a Server Hello message 312 is also generated. The exchange of initial messages, i.e. the Client Hello message 302 and Server Hello message 312, is used to agree on cryptographic key exchange algorithms and exchange random values. If the server 310 does not respond to the Client Hello message 302 with a Server Hello message 312, an error will occur and the connection will fail. Alternatively, the server 310 may select certain security information for use in establishing a secure connection, or if no acceptable choices are presented to the server 310, the server will return a handshake failure notification and close the connection. If the server 310 is able to find an acceptable set of algorithms, the server 310 will dispatch the Server Hello message 312 to the client 300.

If the Server Hello message 312 is successfully transmitted to the client 300, the server transmits the Certificate message 314 if the certificate is to be authenticated. This message provides an indication of an appropriate certificate type. Additionally, a server key exchange message 316 may be sent if required, which is the case where the server does not have a certificate, or if its certificate is for signing only. Thus, depending on the key exchange method, the Server Key Exchange message 316 may be sent to convey cryptographic information allowing the client 300 to communicate the pre-master secret (e.g., a public key to encrypt a secret with, parameters with which the client 300 can complete a key exchange with the result being the pre-master secret, etc.). The server 310 may request a certificate from the client 300, such as by sending a Certificate Request message 318. In connection with the Certificate Request message 318 is a list of the names and types of acceptable Certificate Authorities (CA). The server 310 will ultimately send a completion message such as the Server Hello Done message 320, and await a client 300 response.

However, the client 300 may or may not have the appropriate certificates to access the service. As described above, when a mobile user receives a WIM card (or analogous storage and functionality module), the certificates are not generally configured for the particular user, or for the user's use of a desired service. Thus, in the example of FIG. 3, the client 300 may not be able to supply an appropriate certificate to access the service. Prior art methodologies for handling such a situation involved a complex series of WAP sessions managed through multiple gateways.

The present invention, on the other hand, simplifies the service registration process by automatically accessing the appropriate entity, whether it be the desired service or an enrollment manager. The system can be configured to notify the client terminal of a preferred order of authentication certificate use, and to automatically switch the connection to the secure service or an enrollment manager depending on the particular authentication certificate possessed by the client terminal. In this manner, the connection avoids the segmented connection approach implemented in prior art solutions, and avoids engaging multiple gateways. The automatic service-enrollment switching provided by the present invention also provides seamless operation for the user through automatic, intelligent processes transparent to the user.

Figure 4:
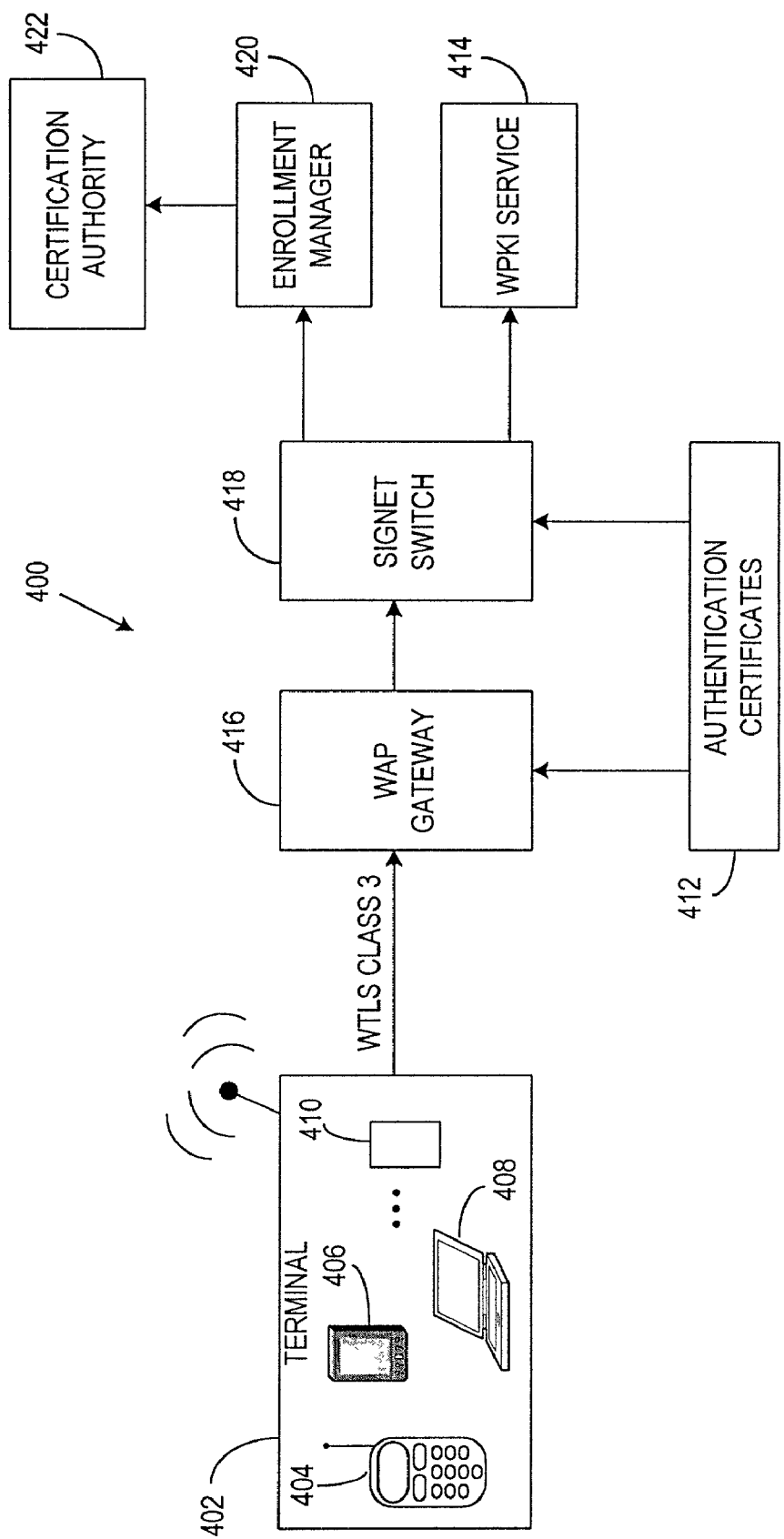
FIGS. 4 and 5 are block diagrams of exemplary automatic authentication management systems in accordance with the present invention.

Referring now to FIG. 4, a block diagram is provided of an exemplary automatic authentication management system 400 in accordance with the present invention. In this example, the user of the wireless terminal 402 is establishing a WTLS Class 3 connection. The terminal 402 may represent any of a number of mobile communication devices, such as a cellular telephone 404, a personal digital assistant (PDA) 406, a notebook or laptop computer 408, or any other type of terminal represented by device 410. As described above, the WTLS Class 3 connection utilizes an authentication certificate. A WTLS Class 3 connection is secure, and involves user and server authentication.

Signed authentication certificates 412 provided by the service provider of the WPKI service 414 are provided to the WAP gateway 416 and signet switch 418. These authentication certificates 412 may be provided as a list of authentication certificates in a preferred order. For example, an exemplary preferred order may be:
1. Service Provider's certificate
2. WIM card manufacturer certificate
3. Other WIM card manufacturer's certificates In accordance with the invention, the signet switch 418 directs the terminal 402 to establish this connection using the first certificate available at the terminal 402 in the order defined by the list of authentication certificates 412. For the exemplary preferred order identified above, the signet switch thus directs the terminal 402 to establish the connection using the certificate that the service provider has signed (i.e., Service Provider's certificate). It can be determined whether the terminal 402 includes this authentication certificate by, for example, examining the WIM or other storage module at the terminal 402.

If the user has not yet received or otherwise obtained the service provider's certificate, the user is not registered for use of the service (e.g., WPKI service 414) provided by that service provider. In this case, the connection is made using the next available authentication certificate 412, which in the previous example is the WIM manufacturer certificate, of which the service provider has indicated that it "trusts." This does not allow the user access to the WPKI service 414, but rather allows the connection to be established based on a trusted secondary authentication certificate. If this connection based on the WIM manufacturer certificate is successfully established, the signet switch 418 determines that the connection was not established with the service provider's authentication certificate, but rather was established using a trusted secondary authentication certificate (i.e., WIM card manufacturer certificate).

The signet switch 418 ascertains which authentication certificate was used to establish the connection, and directs the user to the appropriate application. If the connection had been established using the service provider's certificate, this indicates that the terminal 402 included the appropriate service provider certificate, and the signet switch 418 will direct the user to the service, which in this example is labeled the WPKI service 414 (indicating generally that it is any secure service). Alternatively, if the connection had been established using a trusted WIM card manufacturer's authentication certificate, the signet switch 418 will direct the user to an entity in which registration to the desired service can be effected. In the illustrated example, this entity is the enrollment manager 420. In one embodiment of the invention, the enrollment manager 420 is used to register the user to the desired service 414. The enrollment manager 420 verifies the subscriber/user identity, and determines whether the user is in possession of the private keys in the WIM (or other analogous identity module). The enrollment manager 420 may work cooperatively with a certification authority 422 to make the requisite determinations. If these checks establish that the user has the appropriate security and identification information, the enrollment manager 420 issues the appropriate authentication certificates from trust relationships to the user for that particular service 414.

Figure 5:
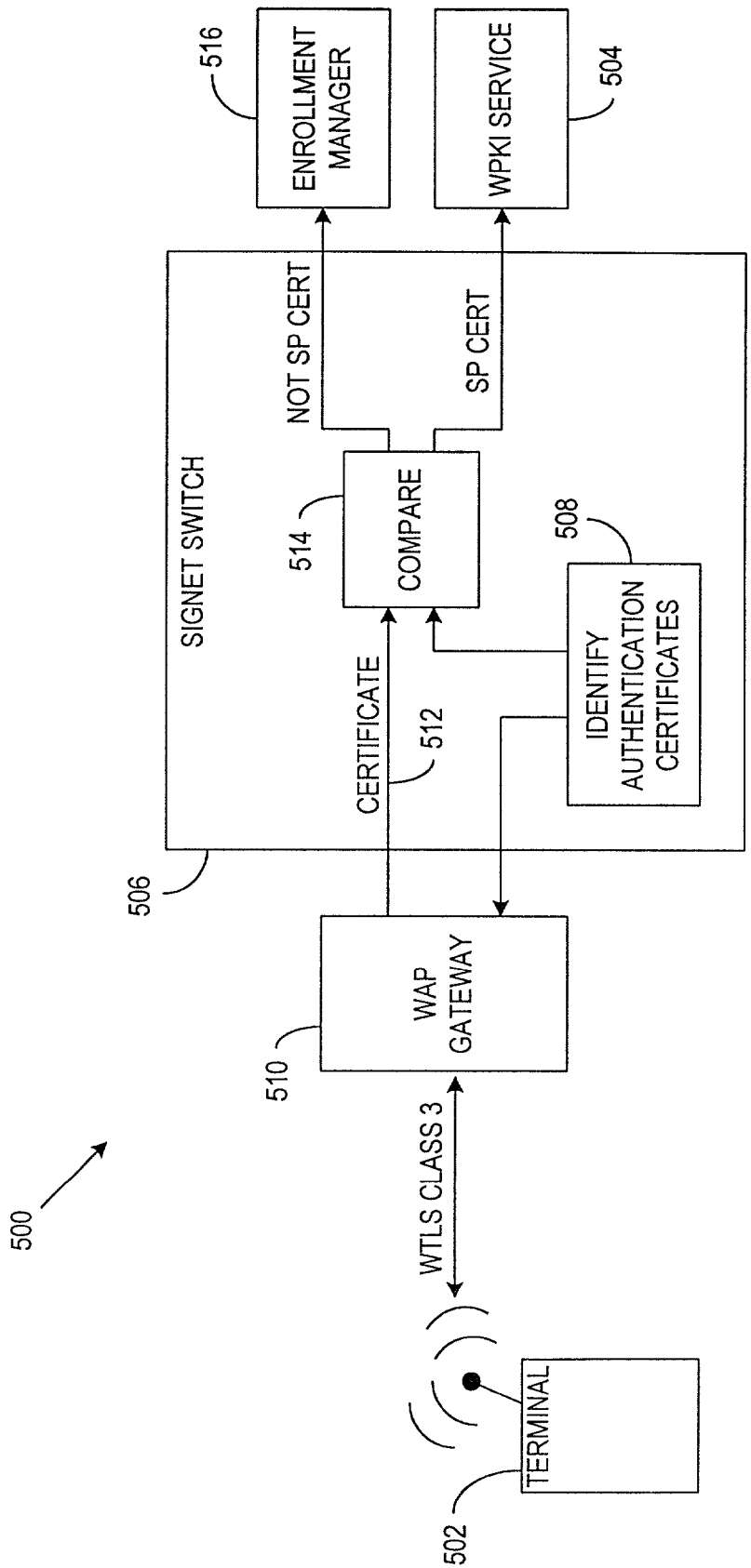

FIG. 5 is a block diagram illustrating another embodiment of an automatic authentication management system 500 in accordance with the present invention. As was described in connection with FIG. 4, wireless terminal 502 user is establishing a WTLS Class 3 connection in this example. Authentication certificates provided by the service provider of the WPKI service 504 are provided to the terminal 502 by the signet switch 506. The switch 506 includes an authentication certificate identification module 508 that provides the preferred order of authentication certificates to the terminal 502 via the gateway 510. In accordance with one embodiment of the invention, the authentication certificates may be stored in a memory, and dispatched by the authentication certificate identification module 508 via a certificate request message, such as the Certificate Request message 318 of FIG. 3. In connection with such a certificate request message is the service provider authentication certificate, as well as a list of the names and types of trusted authorities' authentication certificates identified in a preferred order. In one embodiment of the invention, the service provider certificate is identified as the highest level certificate.

The terminal 502 returns a client certificate, represented by the authentication certificate corresponding to the highest level certificate possessed at the terminal 502. If the terminal 502 has the service provider authentication certificate, the terminal 502 uses that authentication certificate in the client response. This authentication certificate, returned from the terminal 502 and shown on line 512, is compared at compare module 514 to the service provider's authentication certificate. In this example, the compare module 514 will detect that the client certificate used corresponds to the service provider's authentication certificate (SP CERT), thus directing the user to the WPKI service 504.

Alternatively, if the terminal 502 does not have the service provider authentication certificate, the terminal 502 will return the highest level authentication certificate it has, such as a WIM card manufacturer's certificate. In this instance, the compare module 514 will determine that the returned certificate does not correspond to the service provider authentication certificate (NOT SP CERT), and will direct the user to the enrollment manager so the user can register with the service.

The functions associated with the signet switch 506, such as the comparison and routing functions, may be implemented in software used in connection with processing modules, or may be implemented in hardware. In a hardware example, a comparator can determine whether the authentication certificate used by the user in establishing the connection requires connection to the enrollment manager 516 or the service 504. The connection can be directed to the appropriate entity by using the results of the compare module 514 to indicate which path the connection should take. For example, a hardware implementation may use the results of the compare module 514 to control a switch or multiplexing module to direct the user to the appropriate entity. A variety of software implementations may also be used. In one particular embodiment, a java servlet running in the WAP gateway may be used to implement the signet switch 506 functions, thereby incorporating the switch 506 functions into the WAP gateway 510. As is known in the art, Java™ is a general-purpose, object-oriented language, and is a "write once, run anywhere" programming language that facilitates such a execution environment. Servlets are pieces of java source code that add functionality to a web server in a manner similar to the way applets add functionality to a browser. Java servlets are known to those skilled in the art.

The compare module 514 may be configured such that it compares the authentication certificate used by the terminal to establish the connection to the service provider's authentication certificate. In such an implementation, if a match occurs, the user will be directed to the service 504. If no match is found, this indicates that the connection was established with any other authentication certificate (such as a WIM manufacturer certificate), but in any event was not the service provider's authentication certificate. In another embodiment, the compare module 514 may compare each of the authentication certificates 508 in the preferred order list of certificates to the authentication certificate used to establish the connection. In this situation, multiple compare functions are carried out at the compare module 514, which then outputs an indication of which of the comparisons, if any, resulted in a match. Other comparison methodologies may also be used in accordance with the invention. In any case, the results of the determination of the particular authentication certificate used to establish the connection are used to identify the proper manner in which to direct the user.

It should be recognized that while the switch 506 and gateway 510 are illustrated as distinct modules, this is for purposes of facilitating an understanding of the invention, as the switch 506 may be distinct from, or integral to, the WAP gateway 510.

Thus, the signet switch 506 directs the user to establish the connection with the first matching authentication certificate found at the terminal 502 relative to the ordered list of authentication certificates. If the user has not received the service provider's certificate, the connection is built with a trusted authority's authentication certificate, such as a WIM manufacturer's authentication certificate. When the connection is established, the signet switch 506 determines which authentication certificate was used, and directs the user to the appropriate application.

Figure 6:
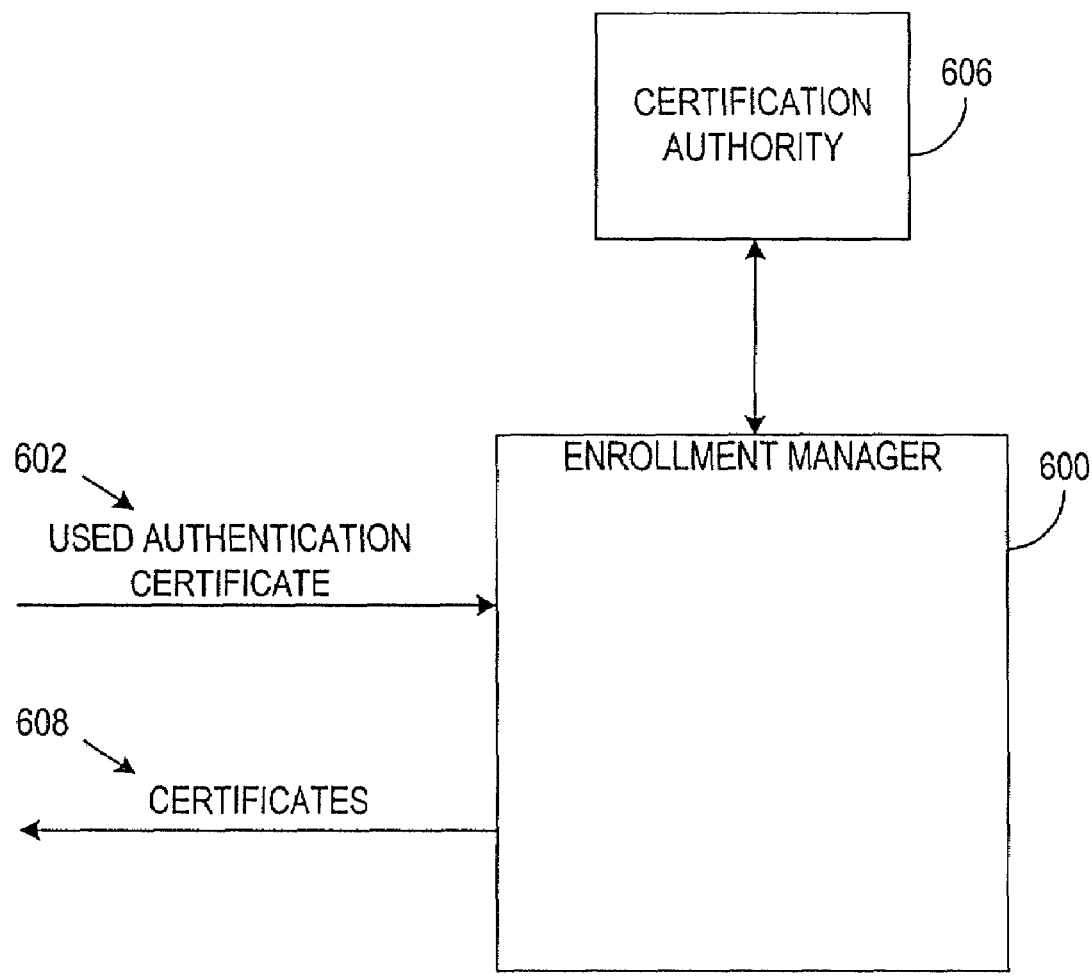
FIG. 6 is a block diagram illustrating one manner in which an enrollment manager may be used in connection with the present invention.

In the case where the user has not received the service provider's certificate, the signet switch 506 automatically directs the user to the enrollment manager 516. This allows the user to become registered for the desired service. FIG. 6 is a block diagram illustrating one manner in which an enrollment manager may be used in connection with the present invention. The enrollment manager 600 receives the authentication certificates 602 used by the user in establishing the connection. As is known in the art, these certificates include information to support authentication, such as certificate validity, issuer name and identification, certificate serial number, signature algorithm, version number, and the like. The enrollment manager 600 uses this information, which was obtained through the automatic routing mechanism provided by the signet switch. The enrollment manager 600 performs certain operations to verify the user identity and determine whether the user is in possession of the appropriate private keys to gain access to the desired service, as was described in connection with FIG. 4.

The enrollment manager 600 may work in connection with a certification authority 606. The certification authority (CA) 606 is an entity that issues, updates, and revokes public key bearing certificates in response to authenticated requests from legitimate registration authorities. More particularly, a CA 606 is a service that can create certificates by placing data in a predetermined format, and then digitally signing that data. CAs act as trusted third parties, making introductions between principals who have no direct knowledge of each other. CA certificates are either signed by themselves, or by some other CA such as a "root" CA. The certification authority 606 holds a private key used to sign domain member key bearing certificates. The enrollment manager 600 with the assistance of the certification authority 606 determine if the user has the appropriate private keys or other requisite information, and if so, the enrollment manager 600 registers the user with the desired service. The resulting certificates 608, such as the authentication and non-repudiation certificates for the desired service, are provided to the user. Other certificates may be returned to the user as well if configured to do so.

Figure 7:
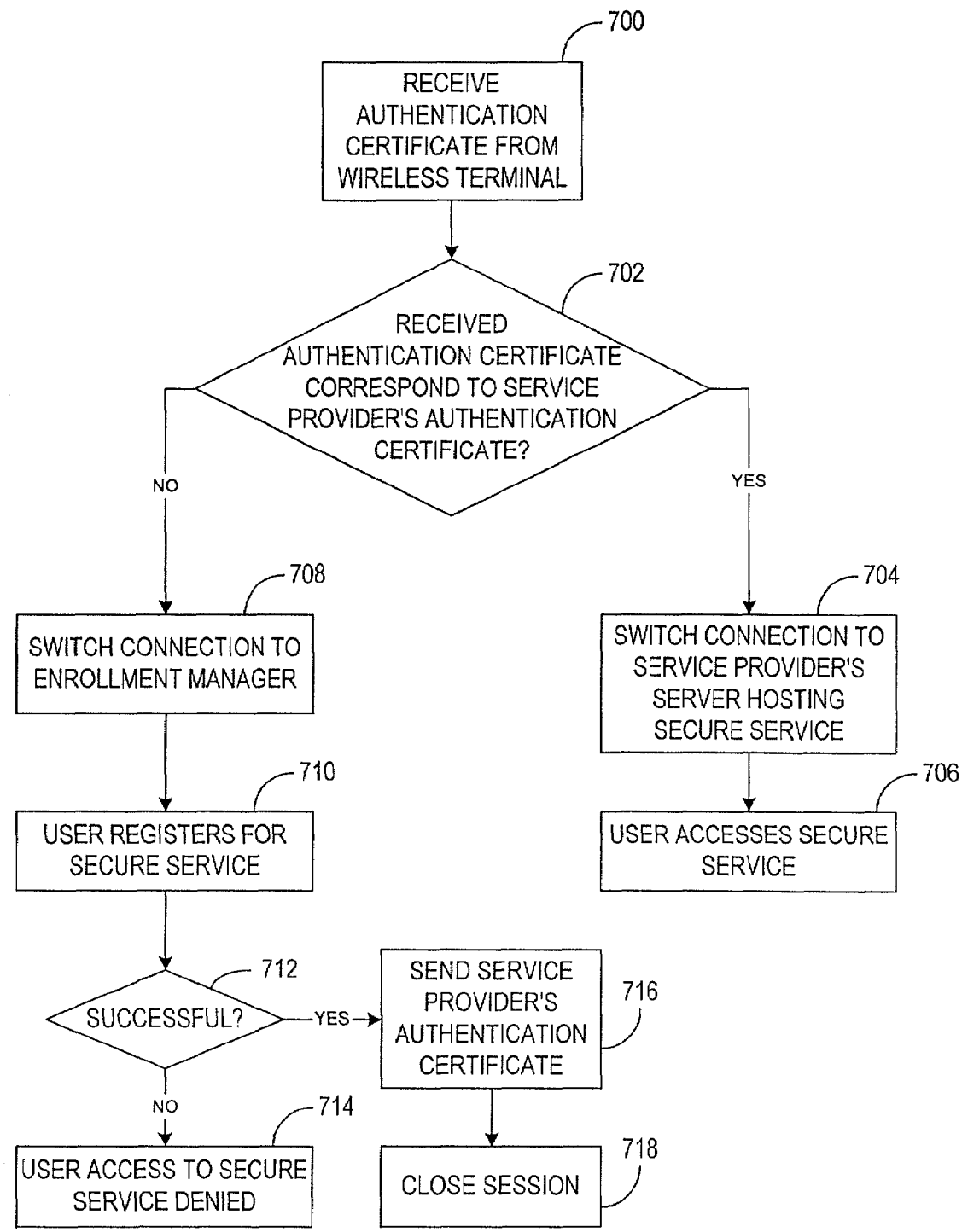
FIGS. 7 and 8 are flow diagrams illustrating exemplary embodiments of processes for automatically directing network connections based on access rights possessed by a user of a wireless terminal.

FIG. 7 is a flow diagram illustrating an exemplary embodiment of a process for automatically directing network connections based on determinable access rights possessed by a user of a wireless terminal. The access rights to a service may be derived from a security certificate, such as an authentication certificate, which is provided by the wireless terminal. The authentication certificate is received 700 from the wireless terminal, and it is determined 702 whether the received certificate corresponds to an authentication certificate recognized by the service provider. If so, the connection is switched 704 to the service provider's server that hosts the secure service. Then, the user may access 706 the secure service via the wireless terminal.

If the received certificate does not correspond to the authentication certificate recognized by the service provider, the connection is switched 708 to the enrollment manager, where the user registers 710 for the secure service. If the registration is unsuccessful, the user is denied access to the secure service, as shown at block 714. If the registration is successful as determined at decision block 712, the service provider's authentication certificate(s) is sent 716 to the user, and the session can be closed 718. Now possessing the service provider authentication certificate, the user may establish a connection to access the service via the wireless terminal, which would follow the flow of blocks 700, 702, 704, and 706.

Figure 8:
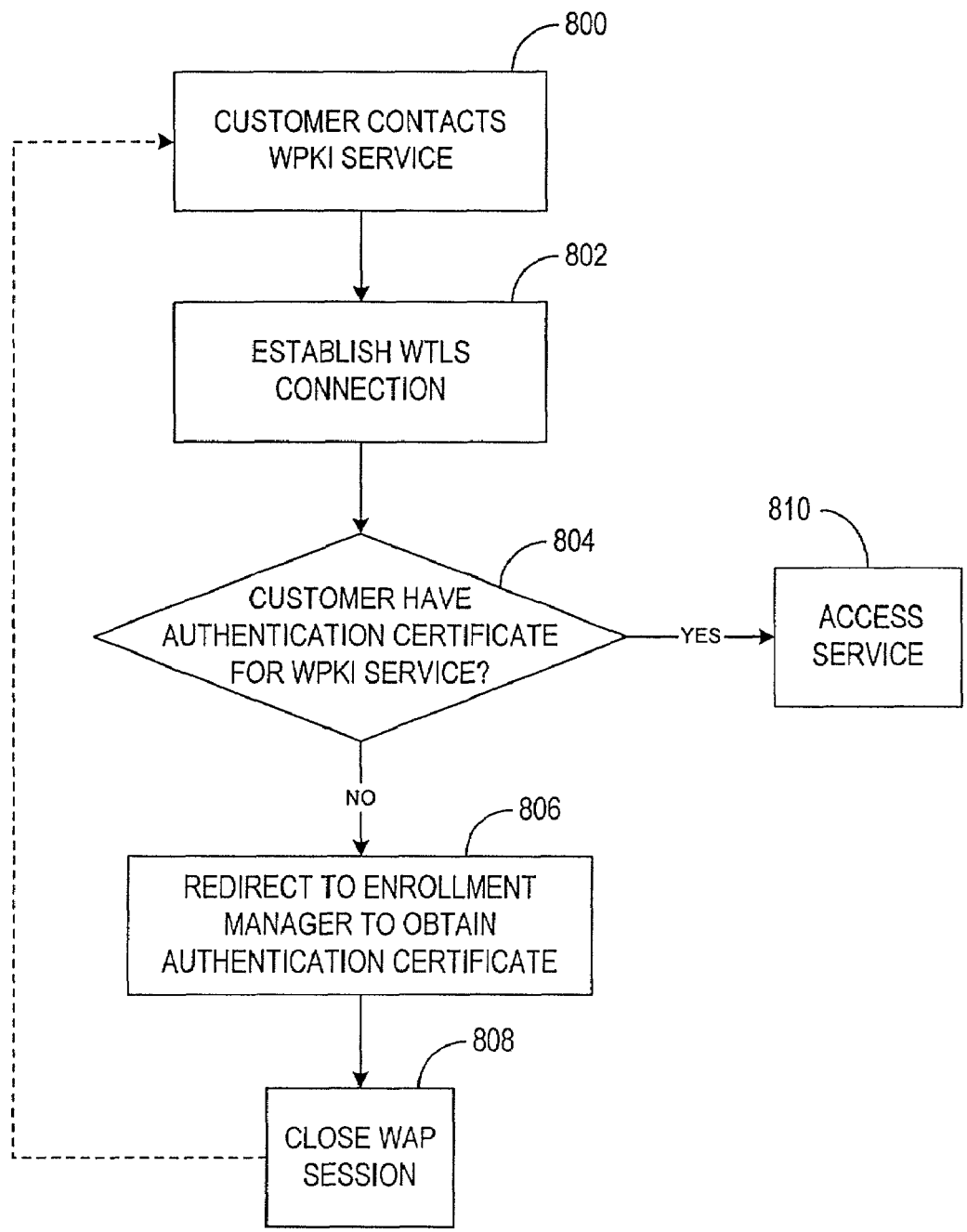

FIG. 8 is a flow diagram illustrating another exemplary embodiment of a process for automatically directing network connections based on access rights possessed by a user of a wireless terminal. In this embodiment, the wireless customer contacts 800 the WPKI service, and establishes 802 a WTLS connection. It is determined 804 whether the customer has the appropriate authentication certificate for the WPKI service. If so, the service is accessed 810 by the user. If not, the connection is redirected 806 to the enrollment manager to obtain the authentication certificate. When the authentication certificate is obtained, the WAP session may be closed 808. At this point, the user may, if desired, access the service by establishing a connection using the service provider's authentication certificate, as depicted by the dashed line returning to block 800.

It should be recognized that the aforementioned embodiments are representative examples of the various automatic access and enrollment principles described herein, and the invention is not limited to these illustrated embodiments.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using, or selling the invention.

Memory devices include, but are not limited to, hard disk drives, diskettes, optical disks, magnetic tape, semiconductor memories such as RAM, ROM, PROMS, etc. Transmitting devices include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out the method of the invention.

It will, of course, be understood that various modifications and additions can be made to the various embodiments discussed hereinabove without departing from the scope or spirit of the present invention. Accordingly, the scope of the present invention should not be limited by the particular embodiments discussed above, but should be defined only by the claims set forth below and equivalents thereof.

What is claimed is:

1. A method for automatically directing network connections based on access rights possessed by a user of a wireless terminal, the method comprising:

receiving a certificate, having security information indicative of the access rights possessed by the user, from the wireless terminal;

determining whether the received certificate corresponds to a service provider authentication certificate which identifies access rights for a targeted service;

directing the network connection to the targeted service if the received certificate corresponds to the service provider authentication certificate;

directing the network connection to an enrollment module to register for the service provider authentication certificate using a user identity and a private key, if the received certificate does not correspond to the service provider authentication certificate; and enrolling the user with the targeted service via the enrollment module when the network connection is directed to the enrollment module; and automatically directing the network connection to the targeted service in response to the enrollment.

2. The method of claim 1, further comprising providing a list of one or more available predetermined certificates to the wireless terminal.

3. The method of claim 2, further comprising providing the list of available predetermined certificates to the wireless terminal in a predetermined order in which selection at the wireless terminal is to be effected.

4. The method of claim 3, further comprising selecting, at the wireless terminal, a locally-stored certificate corresponding to the highest order predetermined certificate that matches the locally-stored certificate.

5. The method of claim 4, further comprising establishing the network connection using the selected locally-stored certificate, wherein the selected certificate is the certificate received from the wireless terminal having security information indicative of the access rights possessed by the user.

6. The method of claim 3, further comprising allowing the wireless terminal to establish the network connection utilizing a locally-stored certificate corresponding to the predetermined certificate that is highest in the predetermined order that matches the locally-stored certificate.

7. The method of claim 1, wherein receiving a certificate comprises receiving the certificate via a client certificate message issued by the wireless terminal.

8. The method of claim 1, further comprising providing the service provider authentication certificate back to the wireless terminal in response to enrolling the user with the targeted service.

9. The method of claim 1, wherein the access rights possessed by the user are stored as local certificates on a Wireless Identity Module (WIM).

10. The method of claim 1, further comprising supplying the wireless terminal with a list of available authentication certificates from which the wireless terminal may use to establish the connection.

11. The method of claim 10, further comprising supplying the wireless terminal with the list of available authentication certificates in a preferred order from which the wireless terminal must utilize a highest preference authentication certificate possessed at the wireless terminal in establishing the connection.

12. The method of claim 11, wherein the highest preference authentication certificate listed is the service provider authentication certificate.

13. The method of claim 10, wherein determining whether the received certificate corresponds to a service provider authentication certificate comprises comparing the received certificate to the list of available authentication certificates.

14. The method of claim 1, wherein determining whether the received certificate corresponds to a service provider authentication certificate comprises comparing the received certificate to the service provider authentication certificate.

15. A system for managing access and enrollment for a secure service available to a user via a wireless terminal, comprising:

a service module from which a service provider avails the secure service to the user of the wireless terminal;

an enrollment manager to effect user registration to the secure service using a user identity and a private key; and a switch module coupled to receive a security certificate utilized by the wireless terminal in establishing a connection therewith, wherein the switch module directs the connection to either the service module or the enrollment manager depending on the security certificate utilized in establishing the connection, wherein the enrollment manager is configured to issue authentication certificates upon successful registration, including a service provider authentication certificate required for use with the secure service, and wherein at least one of the switch module or the enrollment module automatically directs the network connection to the service module in response to the registration.

16. The system as in claim 15, wherein the switch module determines which security certificate is utilized in establishing the connection, and directs the connection to either the service module or the enrollment manager depending on the utilized security certificate.

17. The system as in claim 16, wherein the security certificate is digitally signed by the service provider indicating that the user is registered with the service provider for use of the secure service, thereby directing the connection to the service module.

18. The system as in claim 16, wherein the security certificate is not digitally signed by the service provider, indicating that the user is not registered with the service provider for use of the secure service, thereby directing the connection to the enrollment manager.

19. The system as in claim 16, wherein the security certificate is digitally signed by a trusted authority that is trusted by the service provider, indicating that the user may obtain registration through the trusted authority, thereby directing the connection to the enrollment manager.

20. The system as in claim 15, wherein the security certificate comprises an authentication certificate.

21. The system as in claim 20, wherein the authentication certificate comprises at least one of an identity verification authentication certificate, an authorization certificate, and a non-repudiation certificate.

22. The system as in claim 15, wherein the switch module comprises a list of potential authentication certificates listed in a preferred order of use, and wherein the switch module provides the list of potential authentication certificates to the wireless terminal to allow the wireless terminal to establish the connection using a highest order authentication certificate in accordance with the preferred order of use.

23. The system as in claim 22, wherein the switch comprises a compare module to compare at least one of the predetermined authentication certificates to the authentication certificate used by the wireless terminal.

24. The system as in claim 23, wherein:

(a) the compare module compares a service provider's authentication certificate to the authentication certificate used by the wireless terminal in establishing the connection;

(b) if a match is found, the switch module directs the user to the service module to use the secure service; and (c) if a match is not found, the switch module directs the user to the enrollment manager to effect user registration to the secure service.

25. The system as in claim 23, wherein:

(a) the compare module compares each of the predetermined authentication certificates to the authentication certificate used by the wireless terminal; and (b) the switch module directs the user to the service module or the enrollment manager depending on the results of the comparison.

26. A system for managing user access and enrollment for a secure service available on a network, comprising:

a wireless network including a plurality of wireless terminals operable therein;

a network of computing systems wherein at least one of the computing systems comprises a server computing system hosting a secure service targeted by at least one of the wireless terminals, and wherein at least one of the computing systems comprises an enrollment server to effect user registration to the secure service using a user identity and a private key;

a gateway computing system configured to bridge communications between the wireless network and the network of computing systems; and a network switch coupled to receive an authentication certificate utilized by a wireless terminal in establishing a connection with the network of computing systems, wherein the network switch switches the connection to the server computing system or the enrollment server depending on the authentication certificate utilized by the wireless terminal in establishing the connection, wherein the wireless terminal is enrolled with the secure service via the enrollment server when the network connection is directed to the enrollment server, and wherein at least one of the network switch or the enrollment server automatically directs the network connection to the service module in response to the enrollment.

27. The system as in claim 26, wherein the gateway computing system comprises a Wireless Application Protocol (WAP) gateway, and at least the wireless terminal establishing the connection with the network of computing systems comprises a WAP-compliant terminal.

28. The system as in claim 27, wherein the WAP-compliant terminal comprises one of a wireless telephone, personal digital assistant, wireless pager, and wireless laptop computer.

29. The system as in claim 26, wherein the network of computing systems comprises the Internet, and wherein the Wireless Application Protocol (WAP) is used to communicate between the wireless terminal and the Internet.

30. A system for automatically routing network connections based on access rights possessed by a user of a wireless terminal, comprising:

means for receiving a certificate, having security information indicative of the access rights possessed by the user, from the wireless terminal;

means for determining whether the received certificate corresponds to a service provider authentication certificate which identifies access rights for a targeted service;

means for directing the network connection to the targeted service if the received certificate corresponds to the service provider authentication certificate, and for directing the network connection to an enrollment module to register for the service provider authentication certificate using a user identity and a private key if the received certificate does not correspond to the service provider authentication; and means for enrolling the user with the targeted service based on the network connection being directed to the enrollment module; and means for automatically directing the network connection to the targeted service in response to the enrollment.

31. A computer-readable program storage medium tangibly embodying a program of instructions executable by a computing system to manage user access and enrollment for secure network services by performing steps comprising:

receiving a certificate, having security information indicative of the access rights possessed by the user, from the wireless terminal;

determining whether the received certificate corresponds to a service provider authentication certificate which identifies access rights for a targeted service;

directing the network connection to the targeted service if the received certificate corresponds to the service provider authentication certificate;

directing the network connection to an enrollment module to register for the service provider authentication certificate using a user identity and a private key, if the received certificate does not correspond to the service provider authentication certificate; and facilitating enrollment of the user with the targeted service via the enrollment module when the network connection is directed to the enrollment module; and facilitating automatic redirection of the network connection to the targeted service in response to the enrollment.

32. A network switching module operable in a network for facilitating the management of access and enrollment to at least one secure service available to a user of a wireless terminal, the network switching module comprising:

an authentication certificate identification module configured to store a plurality of authentication certificates associated with the secure service, and to deliver the plurality of authentication certificates to the wireless terminal with a preferred order indication identifying a preferred order of use for connecting to the secure service; and a compare module coupled to receive an authentication certificate from the wireless terminal corresponding to the highest order authentication certificate available at the wireless terminal based on the preferred order indication, wherein the compare module is configured to compare the received authentication certificate with the plurality of authentication certificates and to direct the connection to either the secure service or an enrollment manager to register for the secure service using a user identity and a private key based on the result of the comparison, wherein at least one of the compare module or the enrollment manager automatically directs the connection to the secure service in response to the enrollment.

33. The network switching module as in claim 32, wherein the compare module is configured to direct the connection to the secure service if the result of the comparison indicates that the received authentication certificate is of sufficiently high order to access the secure service.

34. The network switching module as in claim 32, wherein the compare module is configured to direct the connection to the enrollment manager to effect user registration to the secure service if the result of the comparison indicates the received authentication certificate is not of sufficiently high order to access the secure service.

* * * * *